April 2, 1946.  T. C. MULVANY ET AL  2,397,681
DRAPER
Filed Nov. 20, 1944
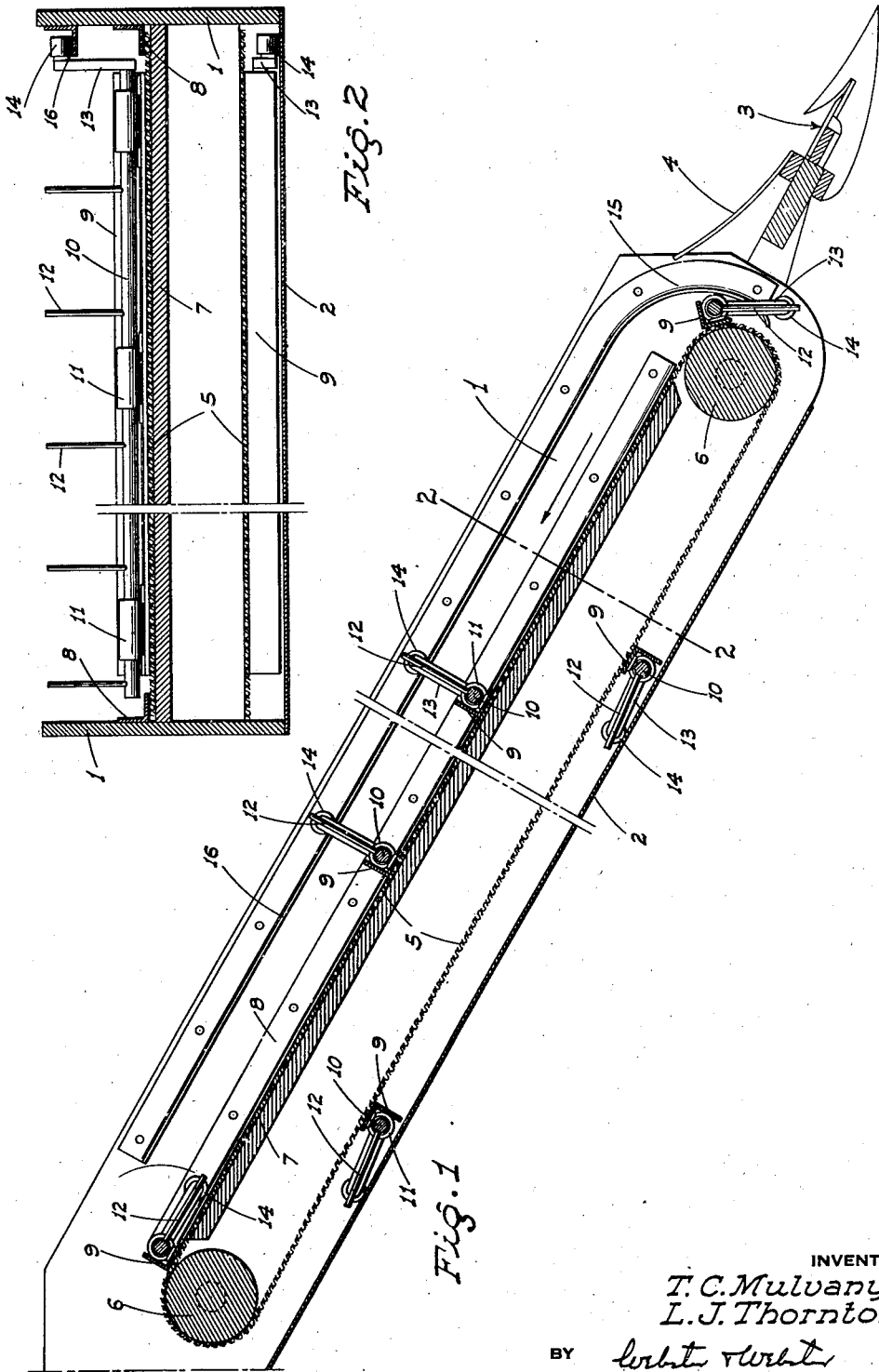
INVENTORS
T. C. Mulvany
L. J. Thornton
BY
ATTORNEYS Patented Apr. 2, 1946

2,397,681

UNITED STATES PATENT OFFICE 2,397,681

DRAPER

Thomas C. Mulvany and Lawrence J. Thornton, Nicolaus, Calif.

Application November 20, 1944, Serial No. 564,330

2 Claims. (Cl. 198—198)

This invention relates in general to, and it is an object to provide, an improved crop elevating draper for agricultural implements such as corn harvesters.

In certain harvesters which include a crop elevating, draper, the draper is frequently set, when working, at a steep incline with the result that part of the crop, for example corn, tends to fall or slide backward on the draper with undesirable results, such as overloading or choking of the draper.

It is therefore an object of this invention to construct the draper so that retrogression of any part of the crop on the draper is effectively prevented; the means employed to accomplish this result being a plurality of transverse rows of fingers mounted on the draper in spaced relation lengthwise thereof, said fingers upstanding from the draper when in its upper run.

Another object of the invention is to provide an improved crop elevating draper, as above, in which each row of fingers is mounted and controlled for movement between a position folded substantially flat against the draper in its lower run, and an upstanding position when in the draper's upper run; the folding against the draper in the lower run being necessary to permit the rows of fingers to pass between said lower run and a floor commonly included in drapers below but adjacent the latter.

These objects are accomplished by means of such structure and relative arrangement of parts as will fully appear by a perusal of the following specification and claims.

In the drawing similar characters of reference indicate corresponding parts in the several views:

Figure 1 is a longitudinal sectional elevation, foreshortened, of the improved crop elevating conveyor.

Figure 2 is a cross section on line 2—2 of Fig. 1.

Referring now more particularly to the characters of reference on the drawing, the present invention is embodied in a crop elevating draper assembly which includes transversely spaced upstanding sides 1 connected together by suitable means, including a bottom plate or floor 2. The draper assembly is disposed, when in operation, at a forward and downward slope as shown, the lower end of the draper assembly supporting a forwardly projecting, transversely extending cutter bar assembly, indicated generally at 3, which includes rearwardly and forwardly curved delivery fingers 4. The cutter bar assembly is fixed with the draper assembly for adjustment therewith. An endless draper 5, including parallel upper and lower runs, extends lengthwise between the sides 1, and is carried at the ends on rolls 6, at least one of which is driven; the direction of drive being such that the upper run of the draper moves upwardly. Between the rolls 6 said upper run of draper 5 is supported by a bed 7 which extends between the sides 1. Along opposite side edges the upper run of the draper is held in engagement with the bed 7 by hold-down flanges 8 which project laterally inwardly from the sides 1. The above is substantially conventional construction of a crop elevating draper assembly, and it is to this structure that the present invention is applied, and which invention comprises the following:

At spaced points in the length thereof the draper is fitted with transversely extending angle members 9 which terminate at their ends adjacent but short of the edges of said draper; said angle members facing rearwardly. Each of the angle members 9 turnably supports a cross rod 10 in journals 11, the cross rods projecting at the end slightly beyond adjacent ends of the corresponding angle members.

Each cross rod 10 is provided with a row of spaced radially projecting fingers 12, said fingers being in alinement transversely of the draper. By reason of the rotary mounting of cross rods 10 the rows of fingers 12 may be swung from an upstanding position relative to the draper to a rearwardly and downwardly folded position in substantially flat or facing relation to said draper.

Adjacent one side of the draper the corresponding ends of the cross rods 10 are each fitted with a crank 13 which includes, on its outer leg, a roller 14.

When the rows of fingers 12 are moving with the draper in its lower run, said rows are folded rearwardly to adjacent said lower run and the rollers 14 then ride on the floor of the draper. When the rows of fingers reach the lower end of the draper and after the rollers have escaped from the lower end of the floor 2, said rollers engage and ride up an upwardly and rearwardly curved cam 15, the eccentricity of which is arranged to cause the then cam actuated cranks 13 to raise the rows of fingers 12 to upstanding position at substantially right angles to the upper run of the draper. At its upper end the cam 15 merges with a roller supporting track 16 which is disposed above and runs parallel to the upper run of the draper; such track being at a height and of a length so that the rows of fingers 12 remain upstanding for substantially the full length of the drapers.

When the rollers 14 reach the upper end of the track 16, said rollers escape therefrom, whereupon the rows of fingers 12 fold rearwardly and downwardly by gravity preparatory to entering the relatively narrow space between the floor 2 and the bottom run of the draper.

When the rows of fingers 12 are upstanding in the upper run of the draper they function effectively to prevent any retrogression on the inclined draper of the crops cut and delivered to said draper by the cutter bar assembly 3.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A crop elevating means for harvesters comprising an endless conveyor inclining upwardly from front to rear and in which the upper run of the conveyor travels upwardly, a plurality of angle irons secured across the conveyor in spaced relation with the bottom flange of each angle iron projecting toward the lower end of the conveyor as such angle irons are carried along the upper run of the conveyor, a rod turnably mounted on each such bottom flange, a plurality of projecting crop engaging fingers fixed on each rod, a crank arm on the end of each rod, a rail lying parallel to and spaced above the upper run of the conveyor, means on the crank arm adapted to ride the rail and hold the corresponding set of fingers in a position substantially at right angles to the plane of the upper run of the conveyor, the rail at its upper end terminating short of the upper run of the conveyor a distance at least equal to the length of the crank arm whereby the crank arm will ride free of the rail at such upper end of the latter and allow the corresponding set of fingers to them drop by gravity to a position substantially parallel to the conveyor before passing to the lower run of such conveyor, the upstanding flange of the angle iron preventing such fingers from dropping in the opposite direction, and cam means at the lower end of the conveyor operable to guide the rail engaging means on the crank arm onto the rail as the crank arm is carried from adjacent the lower to the upper run of the conveyor.

2. A crop elevating means for harvesters comprising an endless conveyor inclining upwardly from front to rear and in which the upper run of the conveyor travels upwardly, a plurality of transversely spaced turnable rods mounted on the conveyor, crop engaging fingers projecting outwardly from each rod, a rail lying parallel to and spaced above the upper run of the conveyor, a crank arm on the end of each rod, means on each crank arm operable to ride the rail and turn the rod to move the corresponding set of fingers into upstanding position at substantially right angles to the upper run of the conveyor, the rail at its upper end terminating short of the corresponding end of the upper run of the conveyor a distance at least equal to the length of the crank arm whereby the crank arm will ride free of the rail at such upper end of the latter, the crank arm and corresponding fingers being then free to drop backward by gravity to a position parallel to the conveyor before passing to the lower run of the conveyor, and cam means at the lower end of the conveyor operable to guide the rail engaging means on the crank arm onto the rail as the crank arm is carried from adjacent the lower to the upper run of the conveyor.

THOMAS C. MULVANY.
LAWRENCE J. THORNTON.